(12) United States Patent
Nakanishi et al.

(10) Patent No.: US 10,483,822 B2
(45) Date of Patent: Nov. 19, 2019

(54) MOTOR

(71) Applicant: Nidec Corporation, Kyoto (JP)

(72) Inventors: Masato Nakanishi, Kyoto (JP); Yasuo Ishiyama, Kyoto (JP); Yoshinobu Nakamura, Kyoto (JP); Takumi Okada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/382,310

(22) Filed: Apr. 12, 2019

(65) Prior Publication Data

US 2019/0238024 A1 Aug. 1, 2019

Related U.S. Application Data

(63) Continuation of application No. 14/748,485, filed on Jun. 24, 2015, now Pat. No. 10,305,345.

(30) Foreign Application Priority Data

Aug. 22, 2014 (JP) .................................. 2014-169422

(51) Int. Cl.
*H02K 5/20* (2006.01)
*H02K 11/33* (2016.01)
(Continued)

(52) U.S. Cl.
CPC .................. *H02K 5/20* (2013.01); *H02K 5/18* (2013.01); *H02K 9/19* (2013.01); *H02K 11/33* (2016.01)

(58) Field of Classification Search
CPC .. H02K 9/19; H02K 5/20; H02K 5/18; H02K 11/33
(Continued)

(56) References Cited

U.S. PATENT DOCUMENTS 6,198,183 B1 * 3/2001 Baeumel ............... F04D 25/068
310/52
7,525,224 B2 * 4/2009 Takenaka ................. H02K 5/20
310/52
(Continued)

FOREIGN PATENT DOCUMENTS

DE 19928023 A1 * 12/1999 ............... H02K 9/19

OTHER PUBLICATIONS

Paquet (DE 19928023 A1) English Translation (Year: 1999).*
Nakanishi et al., "Motor", U.S. Appl. No. 14/748,485, filed Jun. 24, 2015.

*Primary Examiner* — Quyen P Leung
*Assistant Examiner* — Robert E Mates
(74) *Attorney, Agent, or Firm* — Keating & Bennett, LLP

(57) ABSTRACT

A motor includes a rotating shaft, a rotor, a stator, a bracket, and a control device mounted on the bracket. The bracket includes a cylindrical bracket main body, and a stator frame which faces the bracket main body across a clearance and holds an outer surface of the stator on the radially inward side of the bracket main body. The control device is mounted on the bracket main body. The bracket is provided with a cooling passage, and an inflow port and an outflow port connected with the cooling passage. The cooling passage includes a control device cooling passage provided between the bracket main body and the control device, a stator cooling passage provided between the bracket main body and the stator frame, and a communication passage coupling the control device cooling passage and the stator cooling passage.

19 Claims, 13 Drawing Sheets

(51) Int. Cl.
*H02K 5/18* (2006.01)
*H02K 9/19* (2006.01)

(58) Field of Classification Search
USPC .......................................................... 310/54
See application file for complete search history.

(56) References Cited

U.S. PATENT DOCUMENTS

| | | | |
|---|---|---|---|
| 2008/0223557 A1* | 9/2008 | Fulton ...................... | H02K 5/20 165/104.33 |
| 2010/0013331 A1* | 1/2010 | Yoshida ................... | H02K 5/20 310/64 |
| 2011/0169352 A1* | 7/2011 | Nagao ...................... | H02K 5/20 310/59 |
| 2012/0267969 A1* | 10/2012 | Iwamoto .................. | H02K 5/15 310/54 |
| 2013/0049495 A1* | 2/2013 | Matsuo .................... | H02K 5/20 310/53 |
| 2013/0119832 A1* | 5/2013 | Nagao ...................... | H02K 5/20 310/68 B |
| 2013/0206375 A1* | 8/2013 | Yoshida ............... | H01L 23/473 165/170 |

* cited by examiner

MOTOR

BACKGROUND OF THE INVENTION

1. Field of the Invention

The present invention relates to a motor.

2. Description of the Related Art

Japanese Patent Laid-Open No. 2008-206213, for example, discloses a cooling device which cools a motor and a control device. The cooling device described in Japanese Patent Laid-Open No. 2008-206213 circulates cooling water by means of a water pump to cool the motor and the control device.

There has been proposed a configuration which integrates a control device and a motor in order to downsize the entire motor including the control device that drives the motor. It is desired that the motor (more specifically, the stator of the motor) and the control device are cooled efficiently in a configuration which integrates a control device and a motor.

A possible method of improving the cooling efficiency is to increase the flow velocity of cooling water by improving the water pump performance. However, due to the limited improvement of the water pump performance, the cooling efficiency cannot always be improved sufficiently by this method.

SUMMARY OF THE INVENTION

One preferred embodiment of the present invention is a motor including a rotating shaft extending in a central axial direction; a stator located on the radially outward side of the rotor; and a bracket housing the stator. The bracket includes a cylindrical bracket main body, and a stator frame which faces the bracket main body and holds an outer surface of the stator on the radially inward side of the bracket main body. The bracket is provided with a cooling passage through which a cooling medium is able to flow, and an inflow port and an outflow port connected with the cooling passage. The cooling passage includes a first portion provided directly adjacent to a radially outermost surface of the bracket main body, a second portion provided radially between a radially innermost surface of the bracket main body and the stator frame, and a communication passage coupling an output of the first portion and an input of the second portion with each other. A cooling medium in the first portion and a cooling medium in the second portion flow in opposite circumferential directions with respect to one another. At least a portion of the communication passage is located at a position which is farther outward in a radial direction than any portion of the second portion such that the communication passage does not overlap a radially inner surface of the stator cooling passage when viewed in a direction extending along the communication passage. A portion of the communication passage and a portion of the core back overlap one another when viewed from a radial direction which is orthogonal to both the central axial direction and the direction extending along the communication passage.

According to this preferred embodiment of the present invention, there is provided a motor which is integral with a control device and has a structure that significantly improves the cooling efficiency of the stator and the control device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following, motors according to preferred embodiments of the present invention will be described with reference to the drawings.

The scope of the present invention is not limited to the following preferred embodiments, and the present invention can be changed arbitrarily within the scope of the technical concept of the present invention.

In the following drawings, the scale, the number, etc. of components in structures may be varied from those in the actual structures to make each component easy to see.

Figure 2:
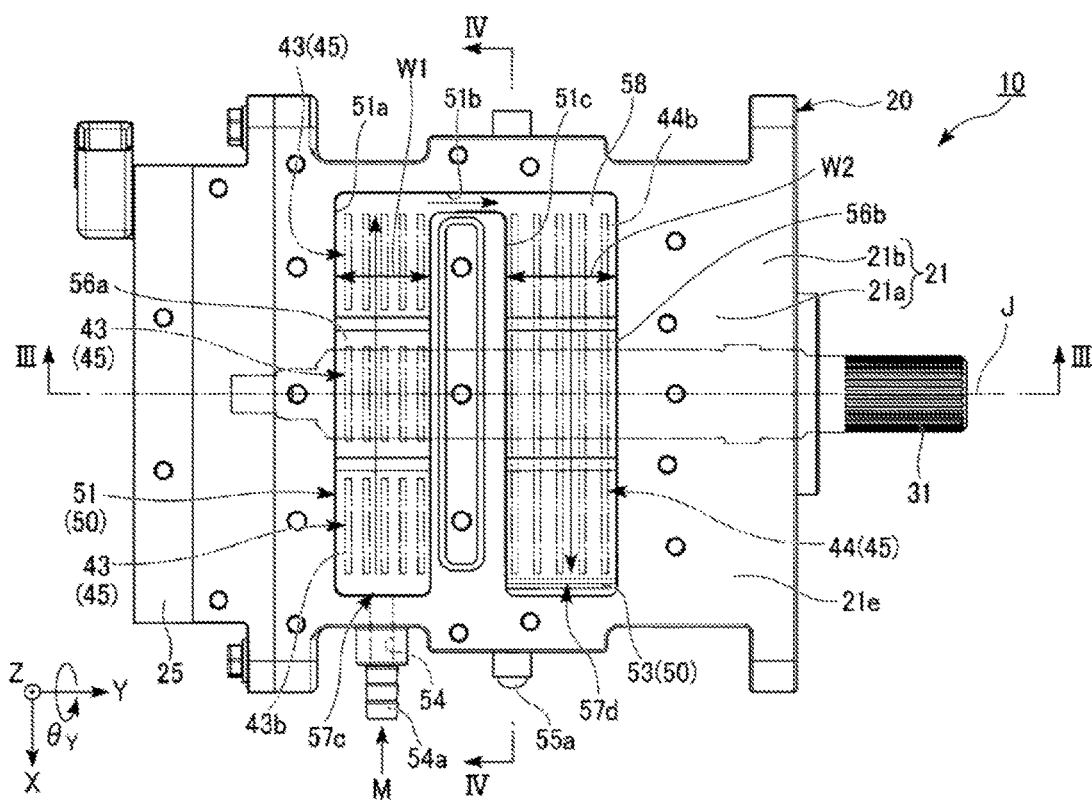
FIG. 2 is a plan view showing the motor of the first preferred embodiment of the present invention.

In the drawings, an XYZ coordinate system as a three-dimensional orthogonal coordinate system is indicated as necessary, in which the Z-axis direction shall be the vertical direction, the Y-axis direction shall be a direction (central axial direction) parallel to a direction in which a central axis J shown in FIG. 2 extends, and the X-axis direction shall be a direction orthogonal to both of the Y-axis direction and the Z-axis direction. In the following description, the positive side (+Y side) in the Y-axis direction shall be referred to as the front side, and the negative side (−Y side) in the Y-axis direction shall be referred to as the rear side. The directions around the central axis J shall be referred to as a $\theta_Y$ direction and a $-\theta_Y$ direction. Unless otherwise noted, the radial direction in the following description shall mean the radial direction of a rotating shaft 31. Unless otherwise noted, the circumferential direction in the following description shall mean the circumferential direction of the rotating shaft 31.

First Preferred Embodiment

Figure 1:
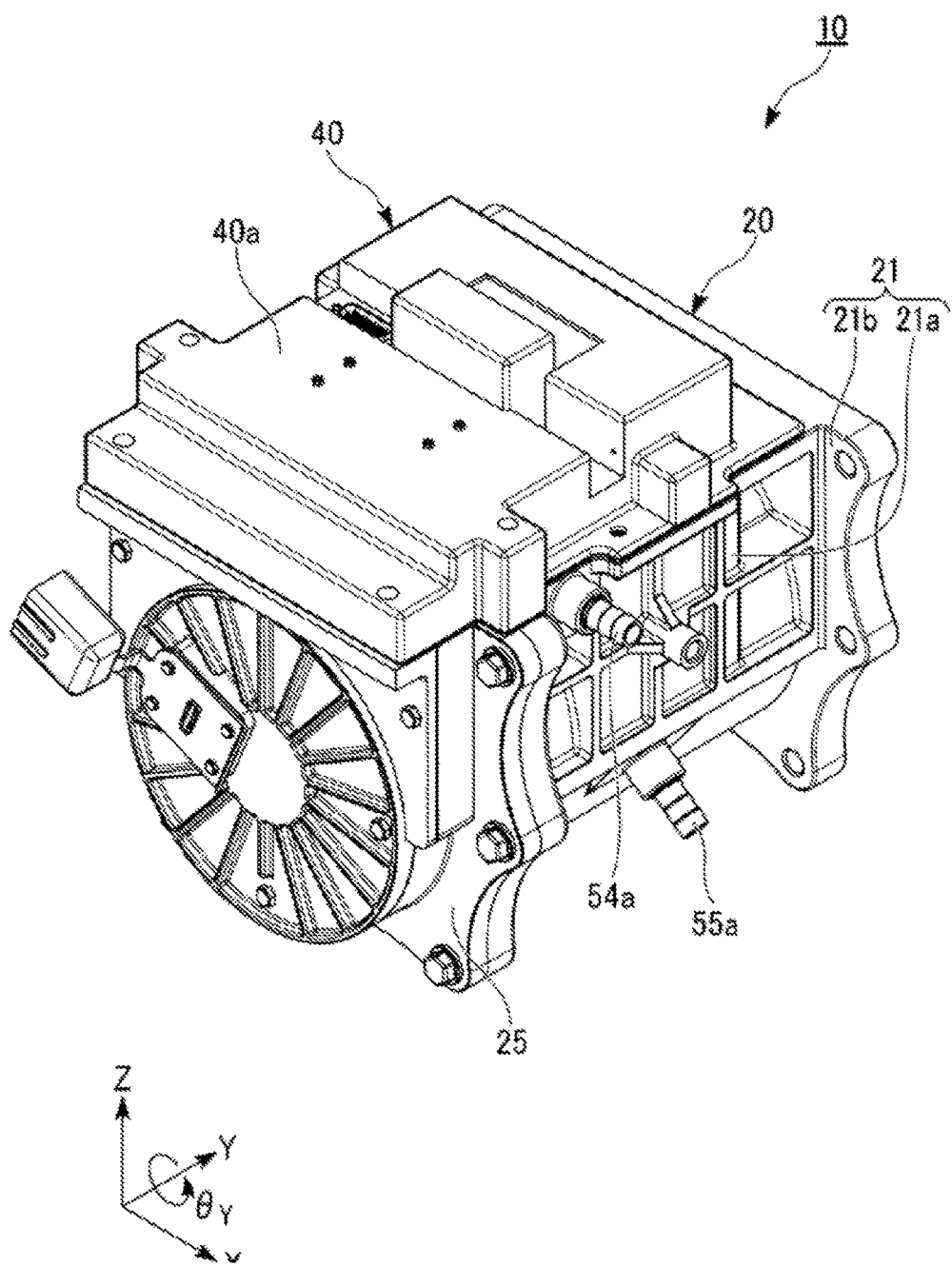
FIG. 1 is a perspective view showing a motor of a first preferred embodiment of the present invention.
Figure 3:
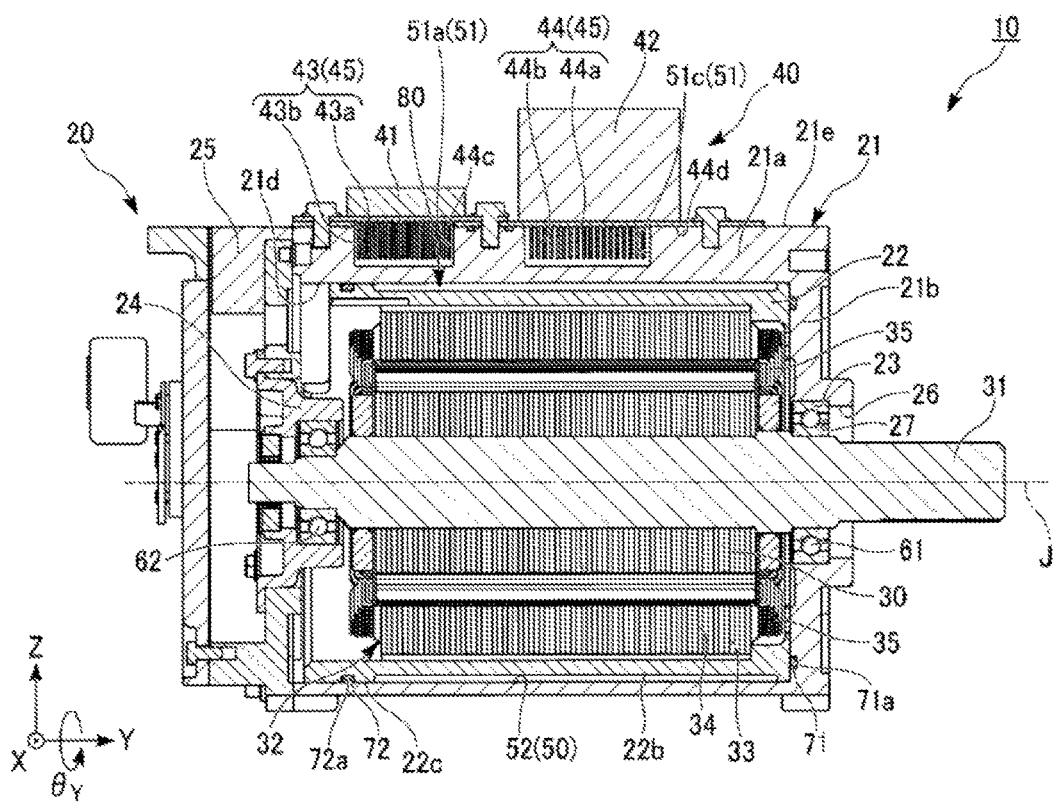
FIG. 3 is a cross-sectional view along the line III-III of FIG. 2 showing the motor of the first preferred embodiment of the present invention.
Figure 4:
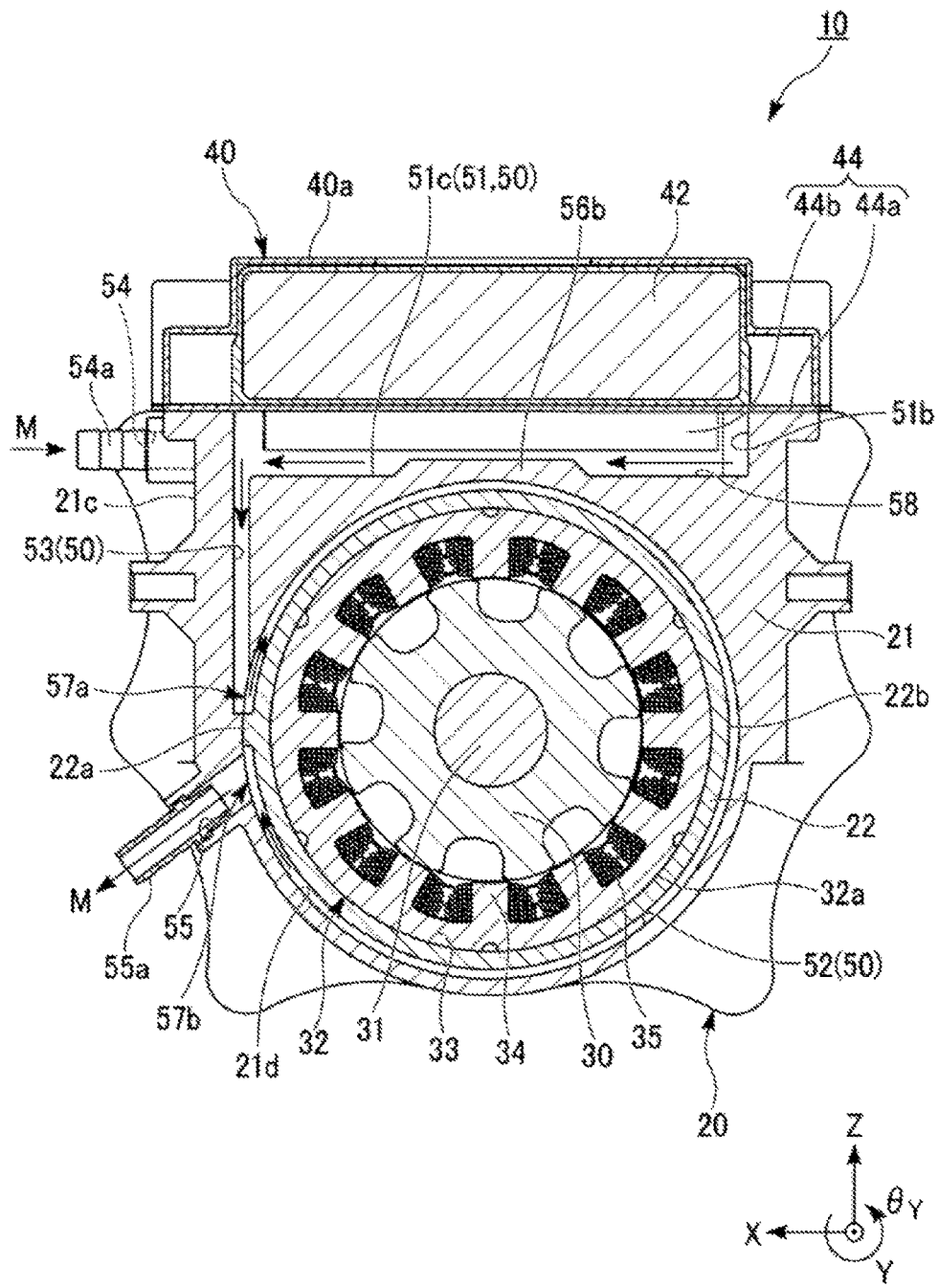
FIG. 4 is a cross-sectional view along the line IV-IV of FIG. 2 showing the motor of the first preferred embodiment of the present invention.

FIG. 1 to FIG. 4 are views showing a motor 10 of the first preferred embodiment of the present invention. FIG. 1 is a perspective view. FIG. 2 is a plan view. FIG. 3 is a cross-sectional view along the line III-III of FIG. 2. FIG. 4 is a cross-sectional view along the line IV-IV of FIG. 2. In FIG. 2, a control device 40 is not shown. In FIG. 3, a control device cover 40a of the control device 40 is not shown.

In the drawings, arrows in cooling passages indicate the main flow direction of a cooling medium M flowing inside the cooling passages.

The motor 10 in this preferred embodiment is preferably, for example, a switched reluctance (SR) motor. The motor 10 is a motor which is mounted, for example, on an electric vehicle. As shown in FIG. 1 to FIG. 4, the motor 10 preferably includes the rotating shaft 31, a rotor 30, a stator 32, a front bearing 61, a rear bearing 62, the control device 40, a bracket 20, and a control device cooling fin 45.

The rotating shaft 31 is fixed on the rotor 30, and the rotor 30, the stator 32, the front bearing 61, and the rear bearing 62 are housed in the bracket 20. The control device 40 is mounted on the bracket 20. The control device cooling fin 45 is mounted on the control device 40, and is disposed between the control device 40 and the bracket 20. In the following, each component will be described in detail.

As shown in FIG. 3, the rotating shaft 31 is centered at the central axis J. That is, the rotating shaft 31 extends in the central axial direction (Y-axis direction). The front-side (+Y-side) end of the rotating shaft 31 protrudes from the bracket 20 through an output shaft hole 26 to be described later. The rotating shaft 31 is supported by the front bearing 61 and the rear bearing 62 so as to be rotatable around the axis (in the e direction and the $-\theta_Y$ direction).

The rotor 30 is fixed on the rotating shaft 31 while surrounding the rotating shaft 31 around the axis (in the e direction). More specifically, the rotor 30 has a through-hole (not labeled) penetrating in the central axial direction (Y-axis direction). The rotating shaft 31 passes through the through-hole of the rotor 30. The inner surface of the through-hole of the rotor 30 holds the outer surface of the rotating shaft 31 which is fitted, for example, by press fitting. The rotating shaft 31 is thus fixed on the rotor 30.

The stator 32 is located on the radially outward side of the rotor 30. The stator 32 surrounds the rotor 30 around the axis (in the e direction). As shown in FIG. 3 and FIG. 4, the stator 32 has a core back 33, teeth 34, and a coil 35.

The core back 33 has a circular cylindrical shape concentric with the rotating shaft 31. The radially outer surface of the core back 33, namely, an outer surface 32a of the stator 32, is fitted on the radially inner surface of the stator frame 22 to be described later.

The teeth 34 extend from the inner peripheral surface of the core back 33 toward the rotating shaft 31. A plurality of teeth 34 are provided, and these teeth 34 are disposed on the inner peripheral surface of the core back 33 at regular intervals in the circumferential direction.

The coil 35 is provided in each of the teeth 34.

The front bearing 61 is preferably held in a front bearing holding hole 23 of the bracket main body 21 to be described later. The front bearing 61 is provided on the front side (+Y side) of the rotor 30.

The rear bearing 62 is preferably held in a rear bearing holding section 24 of a lid 25 to be described later. The rear bearing 62 is provided on the rear side (−Y side) of the rotor 30.

The front bearing 61 and the rear bearing 62 rotatably support the rotating shaft 31.

As shown in FIG. 3, the control device 40 is mounted on the vertically upper side (+Z side) of the bracket 20, more specifically, of the bracket main body 21 to be described later. The control device 40 is configured or programmed to control rotation of the rotor 30 by adjusting power supplied from a power source (not shown) to the stator 32. The control device 40 preferably includes an inverter 41 and a capacitor 42.

While not shown, the inverter 41 is preferably defined by, for example, three inverter elements. The inverter element is preferably, for example, an SiC (silicon carbide) inverter element. There is no particular limitation on the inverter element, and a GaN (gallium nitride) inverter element, an IGBT (insulated gate bipolar transistor), a MOS-FET (metal-oxide-semiconductor field-effect transistor), etc. may alternatively be used as the inverter element.

As shown in FIG. 1, the control device 40 includes the control device cover 40a. The control device cover 40a covers the inverter 41 and the capacitor 42 from the vertically upper side (+Z side).

The bracket 20 houses the rotor 30 and the stator 32. As shown in FIG. 3 and FIG. 4, the bracket 20 preferably includes the bracket main body 21, the stator frame 22, a partition 22a, and the lid 25.

As shown in FIG. 3, the bracket main body 21 preferably has a closed-end, substantially circular cylindrical shape. The bracket main body 21 preferably has a cylinder section 21a extending in the central axial direction (Y-axis direction) and a bottom section 21b provided on the front side (+Y side) of the cylinder section 21a.

In this preferred embodiment, the inner surface of the cylinder section 21a is preferably, for example, a circular cylindrical inner peripheral surface 21d which extends in the central axial direction.

The bottom section 21b is provided with the front bearing holding hole 23 and the output shaft hole 26 which is provided on the front side (+Y side) of the front bearing holding hole 23.

The front bearing holding hole 23 and the output shaft hole 26 communicate with each other, and a through-hole penetrating through the bottom section 21b in the central axial direction (Y-axis direction) is defined by the front bearing holding hole 23 and the output shaft hole 26.

A stepped section 27, of which the inner diameter increases from the front side (+Y side) toward the rear side (−Y side), is preferably provided between the front bearing holding hole 23 and the output shaft hole 26. That is, the inner diameter of the front bearing holding hole 23 is larger than the inner diameter of the output shaft hole 26. The front bearing 61 is held in the front bearing holding hole 23.

On the radially outward side of the rear-side (−Y-side) surface of the bottom section 21b, a front-side O-ring groove 71a is preferably provided along the entire rotating shaft 31 in the circumferential direction. A front-side O-ring 71 is fitted into the front-side O-ring groove 71a. The front-side O-ring 71 contacts the front-side (+Y-side) end surface of the stator frame 22 along the entire circumference.

The stator frame 22 preferably has a circular cylindrical shape. The inner peripheral surface of the stator frame 22 holds the outer surface 32a of the stator 32. Both ends in the central axial direction (Y-axis direction) of an outer peripheral surface 22c in the stator frame 22 are fitted on the inner peripheral surface 21d of the cylinder section 21a in the bracket main body 21. A passage groove 22b is provided between both ends in the central axial direction of the outer peripheral surface 22c which is fitted on the inner peripheral surface 21d.

The passage groove 22b preferably has a concave shape recessed toward the radially inward side from the outer peripheral surface 22c fitted on the inner peripheral surface 21d. The passage groove 22b is provided on the outer peripheral surface 22c of the stator frame 22 along the entire circumference. A clearance is thus provided between the bottom surface of the passage groove 22b and the inner peripheral surface 21d of the cylinder section 21a. In other words, the stator frame 22 faces the bracket main body 21 across the clearance 80 on the radially inward side of the bracket main body 21.

The bottom surface of the passage groove 22b is preferably uneven. This configuration allows for a larger surface area of the stator frame 22. Therefore, as heat of the stator 32 is easily released through the stator frame 22 to the cooling medium M inside a stator cooling passage 52. Therefore, the stator 32 is easily cooled.

On the rear-side (−Y side) in the outer peripheral surface 22c of the stator frame 22 fitted on the inner peripheral surface 21d, a rear-side O-ring groove 72a is provided along the entire circumference. The rear-side O-ring groove 72a is provided farther on the rear side than the passage groove 22b. A rear-side O-ring 72 is fitted into the rear-side O-ring groove 72a. The rear-side O-ring 72 contacts the inner peripheral surface 21d of the cylinder section 21a in the bracket main body 21 along the entire circumference.

In this preferred embodiment, the partition 22a is provided, for example, integrally with the stator frame 22 to define a single monolithic member therewith as shown in FIG. 4. The partition 22a protrudes from the bottom surface of the passage groove 22b of the stator frame 22 toward the radially outward side. The partition 22a is located between the stator frame 22 and the bracket main body 21. In this preferred embodiment, the partition 22a contacts the stator frame 22 and the bracket main body 21. The partition 22a extends in the central axial direction (Y-axis direction). In this preferred embodiment, the partition 22a is provided along the entire passage groove 22b in the central axial direction.

In this preferred embodiment, the partition 22a is preferably provided at the +X-side end of the stator frame 22. In the vertical direction (Z-axis direction), the partition 22a is provided between an inflow position 57a of the stator cooling passage 52 to be described later and an outflow position 57b of the stator cooling passage 52. The details will be described later.

As shown in FIG. 3, the lid 25 is mounted on the rear side (−Y side) of the bracket main body 21. The lid 25 is provided with the rear bearing holding section 24. The rear bearing 62 is held in the rear bearing holding section 24.

As shown in FIG. 2 to FIG. 4, the bracket 20 is provided with a cooling passage 50 through which the cooling medium M can flow, and an inflow port 54 and an outflow port 55 connected with the cooling passage 50.

The cooling passage 50 preferably includes a control device cooling passage 51, the stator cooling passage 52, and a communication passage 53.

There is no particular limitation on the cooling medium M as long as it is able to cool the motor 10, and, for example, water can be selected as the cooling medium M.

As shown in FIG. 2, in this preferred embodiment, the inflow port 54 is connected with the control device cooling passage 51. More specifically, the inflow port 54 is preferably connected with an inverter cooling passage 51a to be described later. An inflow-side connector 54a is inserted into the inflow port 54.

As shown in FIG. 4, in this preferred embodiment, the outflow port 55 is connected with the stator cooling passage 52. An outflow-side connector 55a is inserted into the outflow port 55.

In this preferred embodiment, the outflow port 55 is provided farther on the vertically lower side (−Z side) than the inflow port 54. The inflow port 54 and the outflow port 55 are provided on the same side (+X side) of the bracket 20. A water pump (not shown) is preferably mounted on the inflow-side connector 54a and the outflow-side connector 54b.

In this preferred embodiment, the cooling medium M having flowed into the cooling passage 50 through the inflow port 54 flows inside the cooling passage 50, in the order of the control device cooling passage 51, the communication passage 53, and the stator cooling passage 52, and flows out of the cooling passage 50 through the outflow port 55. In the following, each passage will be described in detail.

As shown in FIG. 2, the control device cooling passage 51 is preferably provided on an upper surface 21e of the bracket main body 21 on the vertically upper side (+Z side). That is, as shown in FIG. 3, the control device cooling passage 51 is provided between the bracket main body 21 and the control device 40. The control device cooling passage 51 preferably includes the inverter cooling passage 51a, a connection portion 51b, and a capacitor cooling passage 51c.

As shown in FIG. 2, the inverter cooling passage 51a extends in a direction (X-axis direction) which is a horizontal direction and is orthogonal to the central axial direction. The inflow port 54 is connected at the +X-side end of the inverter cooling passage 51a. That is, in this preferred embodiment, the inflow position 57c, at which the cooling medium M flows into the control device cooling passage 51, is provided in the inverter cooling passage 51a. The connection portion 51b is connected at the −X-side end of the inverter cooling passage 51a. An inverter cooling fin 43 to be described later is disposed in the inverter cooling passage 51a.

The connection portion 51b extends in the central axial direction (Y-axis direction). The connection portion 51b connects the −X-side end of the inverter cooling passage 51a and the −X-side end of the capacitor cooling passage 51c. Thus, the inverter cooling passage 51a and the capacitor cooling passage 51c have their ends on the same side connected with each other.

In this preferred embodiment, the capacitor cooling passage 51c extends in the direction (X-axis direction) parallel to the direction in which the inverter cooling passage 51a extends. The inverter cooling passage 51a and the capacitor cooling passage 51c are provided side by side. In this preferred embodiment, the capacitor cooling passage 51c is provided on the front side (+Y side) of the inverter cooling passage 51a.

The communication passage 53 is connected at the +X-side end of the capacitor cooling passage 51c. That is, in this preferred embodiment, the outflow position 57d, at which the cooling medium M flows out of the control device cooling passage 51, is provided in the capacitor cooling passage 51c. A capacitor cooling fin 44 to be described later is disposed in the capacitor cooling passage 51c.

In this preferred embodiment, the dimension in the central axial direction (Y-axis direction), namely, a width W1, of the inverter cooling passage 51a is preferably smaller than the dimension in the central axial direction, namely, a width W2, of the capacitor cooling passage 51c.

A bottom surface 58 of the control device cooling passage 51, namely, the wall surface on the stator 32 side (−Z side) of the control device cooling passage 51 is provided with an inverter cooling passage protrusion 56a and a capacitor cooling passage protrusion 56b.

The bottom surface 58 of the inverter cooling passage protrusion 56a and the capacitor cooling passage protrusion 56b is provided in a region including a portion which overlaps the rotating shaft 31 when viewed in a direction from the control device 40 toward the bracket 20 (toward the −Z side).

The inverter cooling passage protrusion 56a is provided in the inverter cooling passage 51a. The capacitor cooling passage protrusion 56b is provided in the capacitor cooling passage 51c.

As shown in FIG. 4, the capacitor cooling passage protrusion 56b preferably protrudes from the bottom surface 58 toward the vertically upper side (+Z side). There is no particular limitation on the cross-sectional shape of the capacitor cooling passage protrusion 56b, and in this preferred embodiment, it is a trapezoidal shape, for example. The same applies to the inverter cooling passage protrusion 56a.

The communication passage 53 couples the control device cooling passage 51 and the stator cooling passage 52 with each other. In this preferred embodiment, the communication passage 53 preferably extends, for example, in the vertical direction (Z-axis direction). The vertically upper-side (+Z-side) end of the communication passage 53 is connected with the +X-side end of the capacitor cooling passage 51c of the control device cooling passage 51. The radially lower-side (−Z-side) end of the communication passage 53 is connected with the stator cooling passage 52.

In this preferred embodiment, the entire communication passage 53 is preferably provided in a position which does not overlap the radially inner surface of the stator cooling passage 52, namely, the bottom surface of the passage groove 22b of the stator frame 22, when viewed in the direction (Z-axis direction) along the communication passage 53. The communication passage 53 faces the outside of the motor 10 across the side surface 21c.

The stator cooling passage 52 is provided between the bracket main body 21 and the stator frame 22. The stator cooling passage 52 is defined by the inner peripheral surface 21d of the cylinder section 21a of the bracket main body 21 and the inner surface of the passage groove 22b of the stator frame 22. The stator cooling passage 52 is provided around the stator 32 along the entire circumference. A portion of the stator cooling passage 52 is preferably partitioned by the partition 22a.

In this preferred embodiment, the communication passage 53 and the outflow port 55 are connected with the stator cooling passage 52. In this preferred embodiment, the location of connection between the stator cooling passage 52 and the communication passage 53 is the inflow position 57a at which the cooling medium M flows into the stator cooling passage 52. In this preferred embodiment, the location of connection between the stator cooling passage 52 and the outflow port 55 is the outflow position 57b at which the cooling medium M flows out of the stator cooling passage 52. The outflow port 55, namely, the outflow position 57b, is provided on the vertically lower side (−Z side) of the inflow position 57a through the partition 22a.

The vertically lower-side (−Z-side) end of the inflow position 57a and the vertically upper-side (+Z-side) end of the partition 22a are located at the same level in the vertical direction (Z-axis direction). In other words, in the direction in which the stator cooling passage 52 extends, namely, in the circumferential direction of the stator 32, one end (+Z-side end) of the partition 22a is provided at the same position as the end at the inflow position 57a on the side (−Z side) closer to the outflow position 57b. In the direction in which the stator cooling passage 52 extends, the other end (−Z-side end) of the partition 22a is provided at a position closer to the outflow position 57b than the one end (+Z-side end) of the partition 22a.

In this specification, the inflow position at which the cooling medium M flows into the stator cooling passage refers to the position at which the cooling medium M, which has flowed into the cooling passage due to the water pump, flows into the stator cooling passage for the first time.

In this description, the outflow position at which the cooling medium M flows out of the stator cooling passage refers to the position at which the cooling medium M, which has flowed out of the stator cooling passage, is discharged to the water pump without returning to the stator cooling passage again.

As shown in FIG. 3, at least a portion of the control device cooling fin 45 is disposed inside the control device cooling passage 51. The control device cooling fin 45 preferably includes the capacitor cooling fin 44 and the inverter cooling fin 43.

The capacitor cooling fin 44 includes a capacitor cooling fin base 44a and a capacitor cooling fin 44b.

The capacitor cooling fin base 44a is preferably a flat plate which is fixed on the upper surface 21e of the bracket main body 21. The capacitor cooling fin base 44a is preferably provided with a through-hole 44c into which an inverter cooling fin 43b to be described later is inserted. While not shown, in this preferred embodiment, for example, three through-holes 44c are preferably provided side by side in the X-axis direction.

The capacitor 42 is mounted on the upper surface of the capacitor cooling fin base 44a. That is, the capacitor cooling fin 44 is mounted on the capacitor 42. The position at which the capacitor 42 is mounted is a position which overlaps the capacitor cooling fin 44b when viewed in the direction (Z-axis direction) orthogonal to the main surface of the capacitor cooling fin base 44a.

A plurality of capacitor cooling fins 44b protrude from a lower surface 44d on the bracket main body 21 side (−Z side) of the capacitor cooling fin base 44a. That is, the plurality of capacitor cooling fins 44b protrude from the capacitor cooling fin base 44a toward the control device cooling passage 51 side (−Z side).

The capacitor cooling fin 44b has a flat plate shape. As shown in FIG. 2, the capacitor cooling fin 44b extends in the horizontal direction (X-axis direction) along the capacitor cooling passage 51c, namely, along the control device cooling passage 51. The plurality of capacitor cooling fins 44b are provided side by side in the central axial direction (Y-axis direction). As shown in FIG. 3, the capacitor cooling fins 44b are disposed inside the capacitor cooling passage 51c, namely, inside the control device cooling passage 51.

It is preferable that the capacitor cooling fin 44 is made with a material having high thermal conductivity. This makes it easier to release the heat of the capacitor 42, which is mounted on the capacitor cooling fin base 44a, through the capacitor cooling fin 44 to the cooling medium M flowing inside the capacitor cooling passage 51c. The capacitor cooling fin 44 is preferably made of, for example, aluminum (including aluminum alloy), copper (including copper alloy), or the like. In this preferred embodiment, the capacitor cooling fin 44 is most preferably made of aluminum, for example.

As shown in FIG. 2, in this preferred embodiment, for example, three inverter cooling fins 43 are preferably provided. As shown in FIG. 3, the inverter cooling fin 43 includes an inverter cooling fin base 43a and the inverter cooling fin 43b.

The inverter cooling fin base 43a has a flat plate shape which is fixed on the upper surface of the capacitor cooling fin base 44a.

The inverter 41 is preferably mounted on the upper surface of the inverter cooling fin base 43a. That is, the inverter cooling fin 43 is mounted on the inverter 41. The position at which the inverter 41 is mounted is a position which overlaps the inverter cooling fin 43b when viewed in the direction (Z-axis direction) orthogonal to the main surface of the inverter cooling fin base 43a.

As shown in FIG. 2, the inverter cooling fin 43b extends in the horizontal direction (X-axis direction) parallel or substantially parallel to the capacitor cooling fin 44b along the inverter cooling passage 51a, namely, along the control device cooling passage 51. The plurality of inverter cooling fins 43b are provided side by side in the central axial direction (Y-axis direction). As shown in FIG. 3, the inverter cooling fin 43b is disposed inside the inverter cooling passage 51a, namely, inside the control device cooling passage 51, through the through-hole 44c of the capacitor cooling fin base 44a.

As with the capacitor cooling fin 44, it is preferable that the inverter cooling fin 43 is made with a material having high thermal conductivity. This makes it easier to release the heat of the inverter 41, which is mounted on the inverter cooling fin base 43a, through the inverter cooling fin 43 to the cooling medium M flowing inside the inverter cooling passage 51a. As with the capacitor cooling fin 44, the inverter cooling fin 43 is preferably made of, for example, aluminum (including aluminum alloy), copper (including copper alloy), or the like.

Since the inverter 41 generates heat more easily than the capacitor 42, it is preferable that the inverter cooling fin 43 is defined by a material having higher thermal conductivity. In this preferred embodiment, the inverter cooling fin 43 is preferably made of copper, for example.

In FIG. 2, the plurality of capacitor cooling fins 44b and inverter cooling fins 43b are schematically indicated by the two-dot chain lines to show the direction in which these capacitor cooling fins 44b and inverter cooling fins 43b extend. That is, while five fins each are shown in FIG. 2, the number of fins is not limited thereto and can be any desirable number.

In this preferred embodiment, as shown in FIG. 2, the cooling medium M flows into the control device cooling passage 51 from the water pump (not shown), which is connected with the inflow-side connector 54a, through the inflow port 54. The cooling medium M having flowed in flows inside the control device cooling passage 51 in the order of the inverter cooling passage 51a, the connection portion 51b, and the capacitor cooling passage 51c. Then, the cooling medium M flows from the capacitor cooling passage 51c into the stator cooling passage 52 through the communication passage 53.

As shown in FIG. 4, the cooling medium M flows inside the stator cooling passage 52 along almost the entire circumference, from the +X-side end of the stator cooling passage 52 through the vertically upper-side (+Z-side) end of the stator cooling passage 52. The cooling medium M flows out of the stator cooling passage 52 through the outflow port 55, and is discharged from the outflow-side connector 55a to the water pump.

In this way, the cooling medium M circulates inside the cooling passage 50 of the bracket 20 to cool the control device 40 and the stator 32.

According to this preferred embodiment, the communication passage 53, which couples the control device cooling passage 51 and the stator cooling passage 52 with each other, is provided in the bracket 20. This makes it easy to reduce the distance over which the control device cooling passage 51 and the stator cooling passage 52 are connected with each other, namely, the length of the communication passage 53. The smaller the length of the communication passage 53, the smaller the length of the entire cooling passage 50, which allows reduction of the load on the water pump when it circulates the cooling medium M. Thus, the cooling efficiency of the entire cooling system of the motor 10 is improved.

According to this preferred embodiment, heat of the cooling medium M is easily released to the bracket 20 in the communication passage 53. Therefore, the temperature of the cooling medium M, which has increased due to heat of the control device 40 in the control device cooling passage 51, is lowered in the communication passage 53. Thus, because the temperature of the cooling medium M flowing into the stator cooling passage 52 is able to be lowered, the stator 32 is easily cooled.

As has been described so far, according to this preferred embodiment, it is possible to obtain a motor which is integral with the control device 40 and has a structure that improves the cooling efficiency of the stator 32 and the control device 40.

If, for example, the method of increasing the flow velocity of the cooling medium M by improving the water pump performance is adopted as a method of improving the cooling efficiency of the motor, the cost of the entire cooling system increases.

According to this preferred embodiment, by contrast, since the cooling efficiency of the motor 10 is improved through the configuration of the cooling passage 50, the cost of the entire cooling system is able to be kept down.

According to this preferred embodiment, since the outflow port 55 is provided farther on the vertically lower side than the inflow port 54, it is easy to dispose the cooling passage so that the cooling medium M flows by gravity. Therefore, according to this preferred embodiment, the load on the water pump when it circulates the cooling medium M inside the cooling passage 50 is reduced.

According to this preferred embodiment, the control device 40 is mounted on the vertically upper side of the bracket 20. Therefore, it is possible to allow the cooling medium M to flow by gravity inside the communication passage 53, which connects the control device cooling passage 51 and the stator cooling passage 52 with each other, from the vertically upper side toward the lower side, by arranging the order so that the cooling medium M flows through the control device cooling passage 51 and the stator cooling passage 52 in this order.

According to this preferred embodiment, since the inflow port 54 is connected with the control device cooling passage 51 and the outflow port 55 is connected with the stator cooling passage 52, the order is arranged so that the cooling medium M flows inside the cooling passage 50 in the order of the control device cooling passage 51 and the stator cooling passage 52. Therefore, according to this preferred embodiment, the load on the water pump is reduced.

According to this preferred embodiment, since the communication passage 53 extends in the vertical direction, decrease in flow velocity of the cooling medium M inside the communication passage 53 is prevented. Thus, as the cooling medium M is allowed to flow into the stator cooling passage 52 while the flow velocity of the cooling medium M is relatively high, the stator 32 is easily cooled.

According to this preferred embodiment, the communication passage 53 is preferably disposed at a position which does not overlap the radially inner surface of the stator cooling passage 52 when viewed in the direction along the communication passage 53. Thus, the position of the communication passage 53 is brought closer to the outer surface of the bracket main body 21, for example, to the side surface 21c in this preferred embodiment. Accordingly, the communication passage 53 faces the outside of the motor 10 across the side surface 21c. This makes it easy to dispose the communication passage 53 in the vicinity of the side surface 21c. The closer the communication passage 53 is to the side surface 21c, the more easily the heat inside the communication passage 53 is released from the side surface 21c of the bracket main body 21. Therefore, according to this preferred embodiment, the temperature of the cooling medium M inside the communication passage 53 is easily lowered and the stator 32 is easily cooled.

Out of the control device 40 and the stator 32, the control device 40 typically generates more heat. Therefore, a configuration in which the control device 40 is easily cooled is preferable.

In this respect, according to this preferred embodiment, since the inflow port 54 is connected with the control device cooling passage 51, the cooling medium M which has not yet recovered heat and is at a relatively low temperature flows into the control device cooling passage 51. Therefore, according to this preferred embodiment, the control device 40 is easily cooled.

According to this preferred embodiment, the partition 22a preferably partitions a portion of the stator cooling passage which is provided around the stator 32 along the entire circumference. Thus, the flow direction of the cooling medium M inside the stator cooling passage 52 is able to be determined by adjusting the inflow position 57a and the outflow position 57b of the stator cooling passage 52 and the position of the partition 22a. Therefore, according to this preferred embodiment, the distance over which the cooling medium M flows inside the stator cooling passage 52 is easily increased, and the stator 32 is easily cooled.

According to this preferred embodiment, one end of the partition 22a in the circumferential direction of the stator 32 is preferably provided at the same position as the end at the inflow position 57a on the side closer to the outflow position 57b. The other end of the partition 22a is provided at a position closer to the outflow position 57b than the one end of the partition 22a. Thus, the flow direction of the cooling medium M, which has flowed into the stator cooling passage 52 from the inflow position 57a, is determined uniformly to be the direction toward the side (+Z side) opposite to the side where the partition 22a is provided. Therefore, according to this preferred embodiment, the flow inside the stator cooling passage 52 is oriented to one direction, and the stator 32 is easily cooled around the entire circumference.

According to this preferred embodiment, the control device cooling fin 45 is mounted on the control device 40 and is disposed inside the control device cooling passage 51. Therefore, according to this preferred embodiment, as heat of the control device 40 is efficiently released through the control device cooling fin 45 to the cooling medium M, the control device 40 is easily cooled.

According to this preferred embodiment, the control device cooling fin 45 preferably includes the inverter cooling fin 43 and the capacitor cooling fin 44. That is, the inverter cooling fin 43 mounted on the inverter 41 and the capacitor cooling fin 44 mounted on the capacitor 42 are separately provided. Therefore, compared with the case where the cooling fins are mounted integrally on the inverter 41 and the capacitor 42, heat of the inverter 41, which generates a large amount of heat, is prevented from being transferred through the cooling fins to the capacitor 42. Therefore, according to this preferred embodiment, since the amount of heat added to the capacitor 42 is reduced, it is possible to use a capacitor which has lower heat resistance and is less costly as the capacitor 42. As a result, the manufacturing cost of the motor 10 is reduced.

According to this preferred embodiment, the control device cooling passage 51 preferably includes the inverter cooling passage 51a in which the inverter cooling fins 43 are disposed, and the capacitor cooling passage 51c in which the capacitor cooling fins 44 are disposed. That is, the passage configured to cool the inverter 41 and the passage configured to cool the capacitor 42 are separately provided. Therefore, compared with the case where the passage configured to cool the inverter 41 and the passage configured to cool the capacitor 42 are integrally provided, the width of each cooling passage is able to be reduced. Therefore, according to this preferred embodiment, because the flow velocity of the cooling medium M inside the inverter cooling passage 51a and the capacitor cooling passage 51c is increased, the control device 40 is easily cooled.

Out of the inverter 41 and the capacitor 42, the inverter 41 typically generates more heat. Therefore, a configuration in which the inverter 41 is easily cooled is preferable.

In this respect, according to this preferred embodiment, the inflow position 57c in the control device cooling passage 51 is preferably provided in the inverter cooling passage 51a. Thus, the cooling medium M which has not yet recovered heat of the capacitor 42 and is at a relatively low temperature flows into the inverter cooling passage 51a. Therefore, according to this preferred embodiment, the inverter 41 is easily cooled.

According to this preferred embodiment, the width W1 of the inverter cooling passage 51a is preferably smaller than the width W2 of the capacitor cooling passage 51c. Therefore, because the flow velocity of the cooling medium M inside the inverter cooling passage 51a is higher than the flow velocity of the cooling medium M inside the capacitor cooling passage 51c, the inverter 41, which generates heat easily, is cooled more easily.

According to this preferred embodiment, the inverter cooling passage 51a and the capacitor cooling passage 51c are preferably provided side by side and have their ends on the same side connected with each other. Thus, the flow direction of the cooling medium M flowing inside the inverter cooling passage 51a and the flow direction of the cooling medium M flowing inside the capacitor cooling passage 51c is oriented to the opposite directions. This allows the cooling medium M to flow into the stator cooling passage 52 from the same side as the side where the inflow port 54 is provided. The cooling medium M, which has flowed into the stator cooling passage 52, then flows around the stator along the entire circumference and is discharged from the outflow port 55 provided on the same side as the inflow port 54. Therefore, according to this preferred embodiment, it is possible to adopt the configuration in which the inflow port 54 and the outflow port 55 are provided on the same side and yet the stator 32 is easily cooled along the entire circumference.

According to this preferred embodiment, since the inflow port 54 and the outflow port 55 are provided on the same side of the bracket 20, it is easy to mount the water pump on the motor 10 and to reduce the installation space. The possibility of reduction in installation space of the motor 10 is helpful especially when the motor 10 is installed in a place such as a motor room of a vehicle where the space is limited.

According to this preferred embodiment, the inverter cooling fin 43*b* extends along the inverter cooling passage 51*a*. Thus, the inverter cooling fin 43*b* is less likely to hinder the flow of the cooling medium M, and a decrease in flow velocity of the cooling medium M inside the inverter cooling passage 51*a* is prevented. The same applies to the capacitor cooling fin 44*b*.

The bracket main body 21 between the control device cooling passage 51 and the stator 32 tends to have a smaller thickness in the portion which overlaps the rotating shaft 31 when viewed in the direction from the control device 40 toward the bracket 20. Thus, when blowholes occur in the bracket main body 21, for example, the cooling medium M may leak from the portion where the bracket main body 21 has a smaller thickness.

In this respect, according to this preferred embodiment, the inverter cooling passage protrusion 56*a* and the capacitor cooling passage protrusion 56*b* are preferably provided in the region of the bottom surface 58 of the control device cooling passage 51 including a portion which overlaps the rotating shaft 31 when viewed in the direction from the control device 40 toward the bracket 20. Thus, because the bracket main body 21 has a larger thickness in the portion which overlaps the rotating shaft 31 when viewed in the direction from the control device 40 toward the bracket 20, leakage of the cooling medium M is prevented.

According to this preferred embodiment, since the inverter cooling passage protrusion 56*a* and the capacitor cooling passage protrusion 56*b* are provided, the passage areas of the inverter cooling passage 51*a* and the capacitor cooling passage 51*c* are reduced. Thus, the flow velocity of the cooling medium M flowing inside the inverter cooling passage 51*a* and the capacitor cooling passage 51*c* is increased.

According to this preferred embodiment, since the front-side O-ring 71 and the rear-side O-ring 72 are provided, leakage of the cooling medium M from the inside of the passage groove 22*b* of the stator frame 22, namely, from the inside of the stator cooling passage 52, is prevented.

In this preferred embodiment, the following configuration can also be adopted.

In this preferred embodiment, the upper end of the partition 22*a* may be located at a different level in the vertical direction from the lower end at the inflow position 57*a*. In this preferred embodiment, the partition 22*a* may be provided at any position within the range in which the distance of a route extending through the partition 22*a* along the stator cooling passage 52, from the inflow position 57*a* to the outflow position 57*b*, is shorter than the distance of a route extending, not through the partition 22*a*, along the stator cooling passage 52 from the inflow position 57*a* to the outflow position 57*b*.

When the partition 22*a* is disposed in this way, the cooling medium M is prevented from flowing to the side on which the distance of the route extending from the inflow position 57*a* to the outflow position 57*b* is short, for example, to the vertically lower side in FIG. 4, so that the flow route of the cooling medium M is defined on the side on which the distance of the route extending from the inflow position 57*a* to the outflow position 57*b* is longer, for example, on the vertically upper side in FIG. 4. Therefore, according to this configuration, the cooling medium M is allowed to flow over at least half of the stator cooling passage 52.

Depending on where the partition 22*a* is disposed, there may be locations where the cooling medium M is stagnant. Even in this case, the route on which the cooling medium M flows steadily covers at least half of the stator cooling passage 52, so that the stator 32 is easily cooled.

In the above description, the partition 22*a* is preferably provided integrally with the stator frame 22, but the present invention is not limited to this example. In this preferred embodiment, the partition 22*a* may be provided integrally with the bracket main body 21, or may be provided as a member separate from both of the bracket main body 21 and the stator frame 22.

In this preferred embodiment, the partition 22*a* may come into contact with only one of the bracket main body 21 and the stator frame 22, or may come into contact with neither the bracket main body 21 nor the stator frame 22. Even with the configuration in which the partition 22*a* does not come into contact with at least one of the bracket main body 21 and the stator frame 22, the stator cooling passage 52 is partially blocked by the partition 22*a*. Thus, the flow rate of the cooling medium M flowing from the inflow position 57*a* to the side (−Z side) where the partition 22*a* is provided is reduced. As a result, the flow rate of the cooling medium M flowing from the inflow position 57*a* to the side (+Z side) where the partition 22*a* is not provided is increased, and almost the entire stator 32 is cooled in the circumferential direction.

In this preferred embodiment, the partition 22*a* may be omitted.

In the above description, the stator frame 22 is preferably a member separate from the bracket main body 21, but the present invention is not limited to this example. In this preferred embodiment, the stator frame 22 may be provided integrally with the bracket main body 21.

In this preferred embodiment, a portion of the communication passage 53 may be provided at a position which overlaps the radially inner surface of the stator cooling passage 52 when viewed in the direction along the communication passage 53. That is, in this preferred embodiment, a configuration can be adopted in which at least a portion of the communication passage 53 is disposed at a position which overlaps the radially inner surface of the stator cooling passage 52 when viewed in the direction along the communication passage 53.

In this preferred embodiment, the communication passage 53 may extend in a curved form or may be bent.

In this preferred embodiment, the stator cooling passage 52 may be provided in only a portion of the circumference of the stator 32.

In the above description, the control device cooling passage 51 is provided on the upper surface 21*e* of the bracket main body 21, namely, the control device cooling passage 51 opens in the upper surface 21*e*, but the present invention is not limited to this example. In this preferred embodiment, the control device cooling passage 51 may be embedded in the bracket main body 21.

In this preferred embodiment, it is not absolutely necessary that the inverter cooling passage 51a and the capacitor cooling passage 51c are parallel to each other.

In this preferred embodiment, the control device cooling fin 45 may include only one of the inverter cooling fin 43 and the capacitor cooling fin 44.

In this preferred embodiment, the control device cooling fin 45 may be omitted.

In this preferred embodiment, the core back 33 of the stator 32 may have a polygonal cylindrical shape.

In each component, "fitting" indicates press fitting, insertion, etc.

Figure 5:
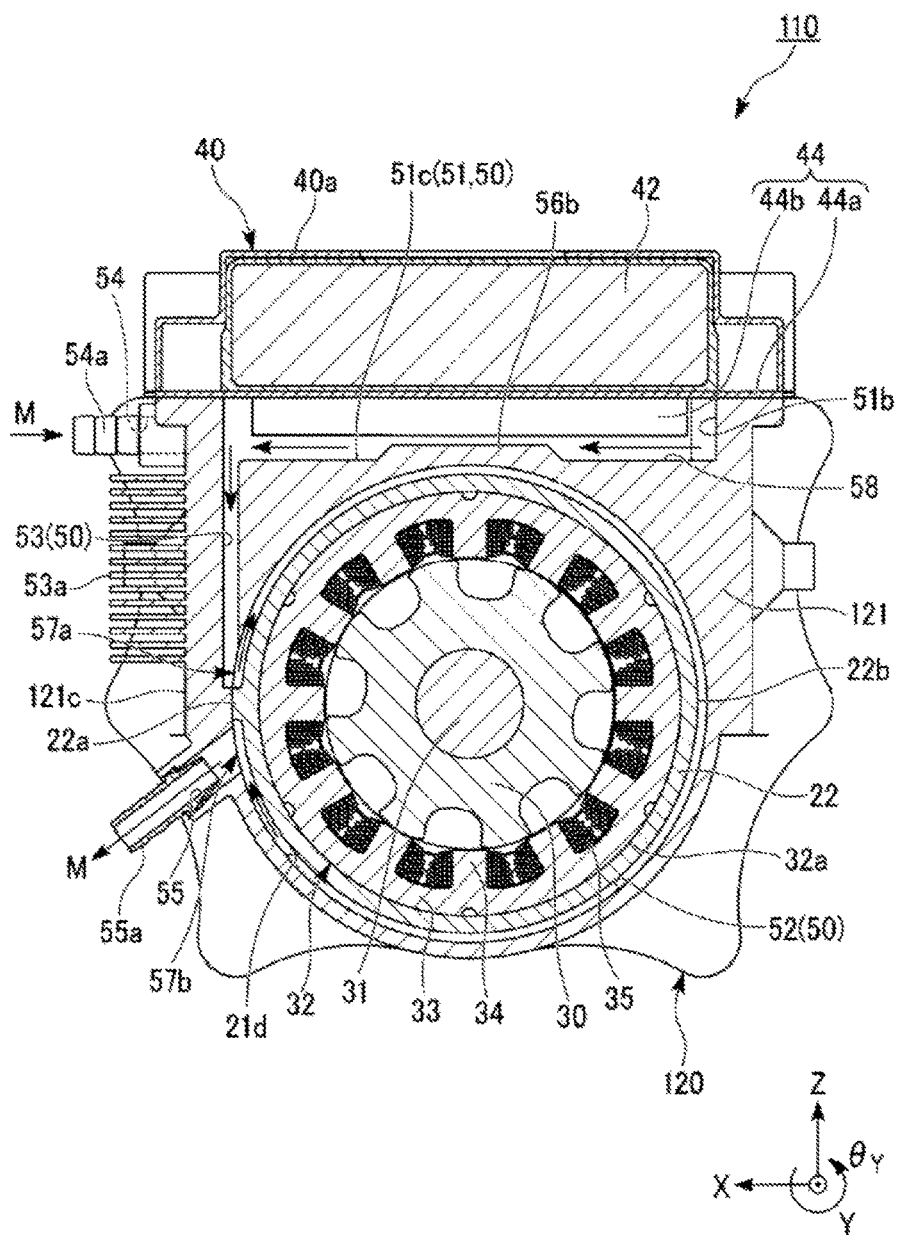
FIG. 5 is a cross-sectional view showing another example of the motor of the first preferred embodiment of the present invention.

In this preferred embodiment, the configuration shown in FIG. 5 may be adopted.

In the following, configurations that are similar to those described above may be omitted from the description while being appropriately denoted by the same reference signs.

FIG. 5 is a cross-sectional view (ZX-plane view) showing a motor 110 which is another example of another preferred embodiment of the present invention.

As shown in FIG. 5, the motor 110 includes a bracket 120. The bracket 120 preferably includes a bracket main body 121.

The bracket main body 121 is different from the above-described bracket main body 21 in that it is provided with a plurality of communication passage cooling fins 53a on a side surface 121c on the side (+X side) closer to the communication passage 53.

The plurality of communication passage cooling fins 53a are provided side by side in the vertical direction (Z-axis direction). While not shown, the plurality of communication passage cooling fins 53a preferably extend, for example, in the central axial direction (Y-axis direction).

The positions at which the communication passage cooling fins 53a are provided on the side surface 121c are positions which overlap the communication passage 53 when viewed in the direction (X-axis direction) perpendicular to the side surface 121c.

The other configurations of the bracket 120 and the bracket main body 121 are preferably the same as the configurations of the bracket 20 and the bracket main body 21 shown in FIG. 1 to FIG. 4.

According to this configuration, heat of the cooling medium M flowing inside the communication passage 53 is easily released through the communication passage cooling fins 53a to the outside of the bracket main body 121. Thus, because the temperature of the cooling medium M inside the communication passage 53 is lowered, the stator 32 is easily cooled.

In this configuration, instead of the communication passage cooling fins 53a shown in FIG. 5, an uneven shape defined by ribs may be provided on the side surface 121c of the bracket main body 121. As this allows for a larger surface area of contact between the bracket main body 121 and the outside of the motor 10, the cooling efficiency is enhanced.

Figure 6A:
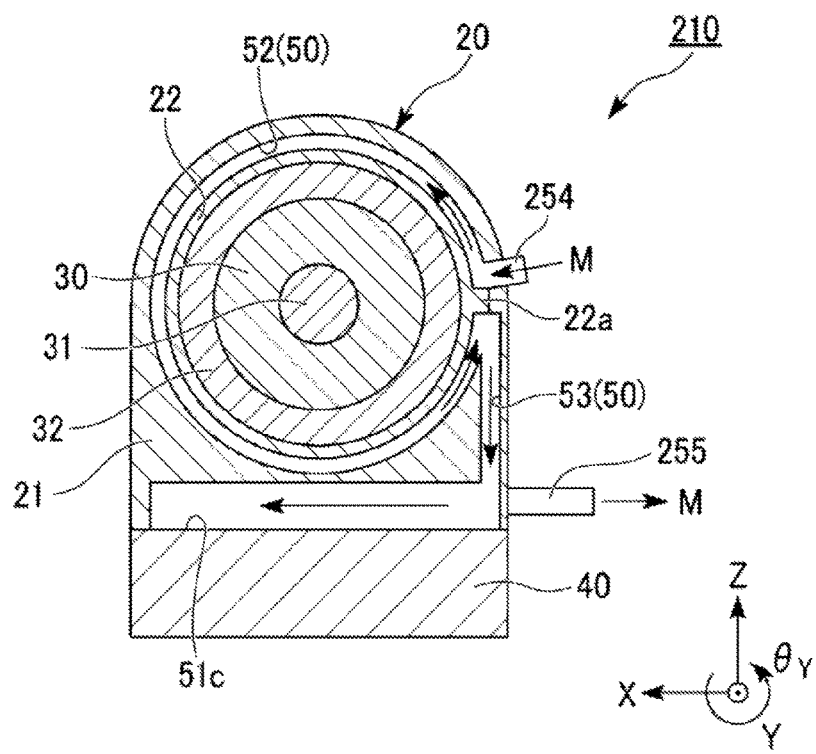
FIG. 6A is a cross-sectional view showing another example of the motor of the first preferred embodiment of the present invention.
Figure 6B:
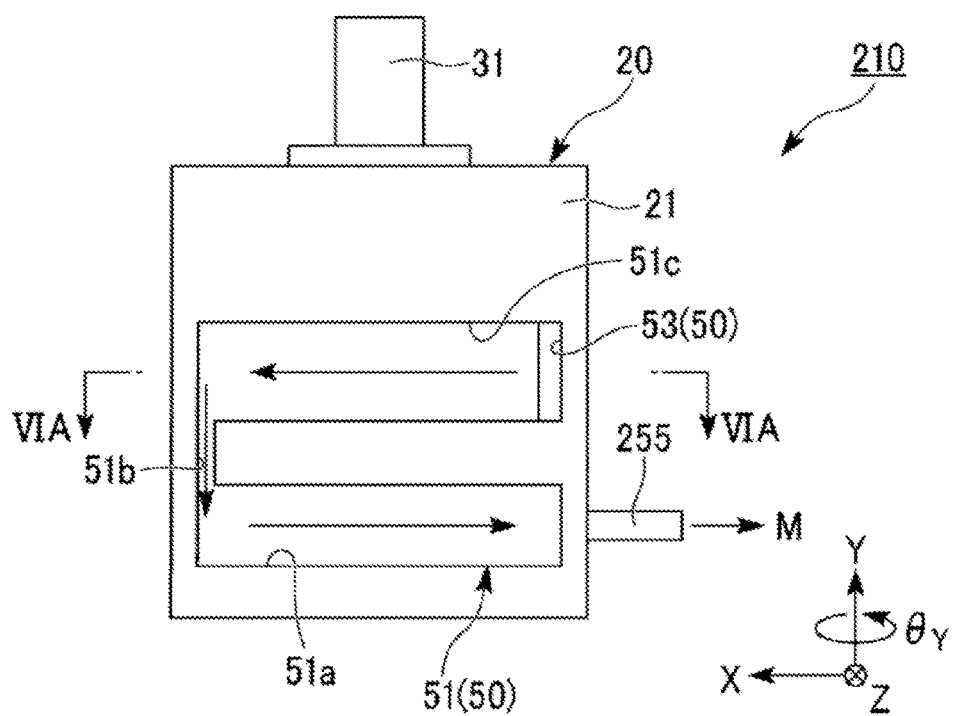
FIG. 6B is a bottom view showing another example of the motor of the first preferred embodiment of the present invention.

In this preferred embodiment, as shown in FIGS. 6A and 6B, the motor 10 may be used upside down.

FIGS. 6A and 6B are views showing a motor 210 which is another example of a further preferred embodiment. FIG. 6A is a cross-sectional view along the line VIA-VIA of FIG. 6B. FIG. 6B is a bottom view. In FIG. 6B, the control device 40 is not shown.

Configurations that are similar to those described above may be omitted from the description while being appropriately denoted by the same reference signs.

As shown in FIGS. 6A and 6B, the motor 210 is preferably different from the motor 10 shown in FIG. 1 to FIG. 4 in that it is used upside down, and that the inflow port 54 of the motor 10 is used as an outflow port 255 while the outflow port 55 of the motor 10 is used as an inflow port 254. The other configurations of the motor 210 are preferably the same as those of the motor 10.

In this configuration, the flow of the cooling medium M in the cooling passage 50 is reversed from that in the motor 10.

According to this configuration, since the inflow port 254 is connected with the stator cooling passage 52, the cooling medium M which has not yet recovered heat of the control device 40 and is at a relatively low temperature flows into the stator cooling passage 52. Thus, according to this configuration, the stator 32 is easily cooled.

According to this configuration, the control device 40 is preferably mounted on the vertically lower side of the bracket 20. Therefore, decrease in flow velocity of the cooling medium M inside the communication passage 53 is prevented when the cooling medium M flows from the stator cooling passage 52 through the communication passage 53 into the control device cooling passage 51.

In this configuration, the communication passage 53 may be connected with the inverter cooling passage 51a. In this case, since the inverter cooling passage 51a is cooled before the capacitor cooling passage 51c, the inverter cooling passage 51a, which generates a large amount of heat, is easily cooled.

In this preferred embodiment, the control device 40 may be provided on the rear side (the other side) in the central axial direction of the bracket 20, more specifically, of the bracket main body 21. According to this configuration, since the heat is released from the entire circumference of the stator 32 in the bracket main body 21, the stator 32 is easily cooled.

Second Preferred Embodiment

The second preferred embodiment of the present invention is preferably different from the first preferred embodiment in positions at which the cooling medium M flows into and out of the stator cooling passage.

Configurations that are similar to those of the above-described preferred embodiment may be omitted from the description while being appropriately denoted by the same reference signs discussed above.

Figure 7A:
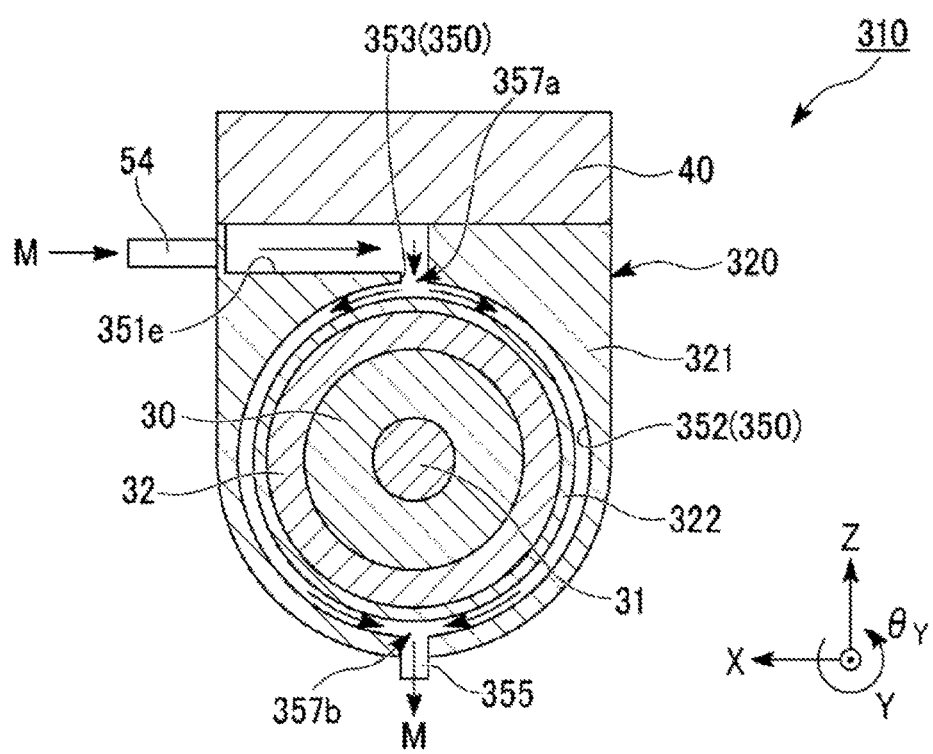
FIG. 7A is a cross-sectional view showing a motor of a second preferred embodiment of the present invention.
Figure 7B:
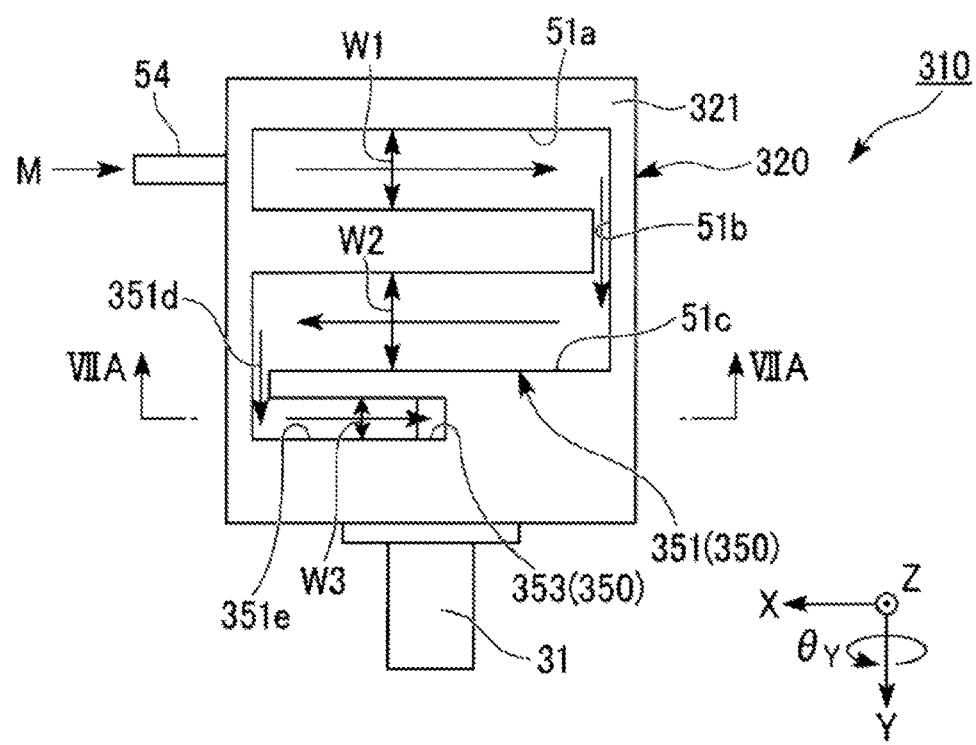
FIG. 7B is a plan view showing a motor of a second preferred embodiment of the present invention.

FIGS. 7A and 7B are views showing a motor 310 of this preferred embodiment. FIG. 7A is a cross-sectional view along the line VIIA-VIIA of FIG. 7B. FIG. 7B is a plan view. In FIG. 7B, the control device 40 is not shown.

As shown in FIGS. 7A and 7B, the motor 310 of this preferred embodiment includes a bracket 320. The bracket 320 preferably includes a bracket main body 321 and a stator frame 322.

Except that it is not provided with the partition 22a, the stator frame 322 preferably has the same configuration as the stator frame 22 of the first preferred embodiment.

The bracket main body 321 is preferably provided with a cooling passage 350, the inflow port 54, and an outflow port 355.

The cooling passage 350 preferably includes a control device cooling passage 351, a stator cooling passage 352, and a communication passage 353.

As shown in FIG. 7B, the control device cooling passage 351 preferably includes the inverter cooling passage 51a, the connection portion 51b, the capacitor cooling passage 51c, a connection portion 351d, and a connection passage 351e.

The connection portion 351d extends in the central axial direction (Y-axis direction) and connects the capacitor cooling passage 51c and the connection passage 351e with each other.

The connection passage 351e preferably extends in a direction (X-axis direction) parallel or substantially parallel to the inverter cooling passage 51a and the capacitor cooling passage 51c. The connection passage 351e is provided on the front side (+Y side) of the capacitor cooling passage 51c side by side with the capacitor cooling passage 51c.

The +X-side end of the connection passage 351e is connected with the connection portion 351d. That is, the capacitor cooling passage 51c and the connection passage 351e have their ends connected with each other on the side (+X side) opposite to the side (−X side) where the inverter cooling passage 51a and the capacitor cooling passage 51c are connected with each other.

The −X-side end of the connection passage 351e is connected with the communication passage 353. In this preferred embodiment, the −X-side end of the connection passage 351e is located at the center in the width direction (X-axis direction) of the bracket main body 321.

The dimension in the central axial direction (Y-axis direction), namely, the width W3, of the connection passage 351e is preferably smaller than the width W1 of the inverter cooling passage 51a and the width W2 of the capacitor cooling passage 51c.

As shown in FIG. 7A, the communication passage 353 is preferably connected with the vertically upper (+Z-side) end of the stator cooling passage 352.

The stator cooling passage 352 preferably has the same configuration as the stator cooling passage 52 of the first preferred embodiment shown in FIG. 4 except that the positions of inflow and outflow of the cooling medium M are different and that the stator cooling passage 352 is not partitioned by the partition 22a.

The vertically upper (+Z-side) end of the stator cooling passage 352 is connected with the communication passage 353. The vertically lower (−Z-side) end of the stator cooling passage 352 is connected with the outflow port 355. That is, an inflow position 357a at which the cooling medium M flows into the stator cooling passage 352 is preferably provided, relative to the rotating shaft 31, on the side opposite to an outflow position 357b at which the cooling medium M flows out of the stator cooling passage 352. The outflow position 357b is provided on the vertically lower side of the inflow position 357a.

According to this preferred embodiment, the inflow position 357a is provided at the vertically upper end of the stator cooling passage 352, and the outflow position 357b is provided at the vertically lower end of the stator cooling passage 352. Thus, as shown in FIG. 7A, the cooling medium M having flowed from the inflow position 357a into the stator cooling passage 352 divides in two directions (±X directions) and flows inside the stator cooling passage 352 by the gravity. Therefore, according to this preferred embodiment, decrease in flow velocity of the cooling medium M inside the stator cooling passage 352 is prevented. Moreover, it is possible to cool the stator 32 along the entire circumference without partitioning the stator cooling passage 352.

According to this preferred embodiment, since the length of the control device cooling passage 351 is increased by the length of the connection passage 351e, the control device 40 is easily cooled.

According to this preferred embodiment, the connection passage 351e and the capacitor cooling passage 51c have their ends connected with each other on the side opposite to the side where the inverter cooling passage 51a and the capacitor cooling passage 51c are connected with each other. Therefore, it is possible to adjust the position, at which the control device cooling passage 351 and the communication passage 353 are connected with each other, by adjusting the length of the connection passage 351e, while securing a sufficient length of the inverter cooling passage 51a and the capacitor cooling passage 51c for cooling the inverter 41 and the capacitor 42. Thus, it is easy to connect the communication passage 353 with the vertically upper end of the stator cooling passage 352 as in this preferred embodiment, without reducing the cooling efficiency of the control device 40.

In this preferred embodiment, the connection passage 351e is preferably provided farther on the front side than the inverter cooling passage 51a and the capacitor cooling passage 51c. Therefore, as compared with the case where the connection passage 351e is provided between the inverter cooling passage 51a and the capacitor cooling passage 51c in the central axial direction, the dimension in the central axial direction of the control device 40 is able to be reduced.

According to this preferred embodiment, since the width W3 of the connection passage 351e is smaller than the width W1 of the inverter cooling passage 51a and the width W2 of the capacitor cooling passage 51c, the flow velocity of the cooling medium M in the connection passage 351e is increased and the control device 40 is more easily cooled.

According to this preferred embodiment, since the flow direction of the cooling medium M inside the connection passage 351e is oriented to the same direction as the flow direction of the cooling medium M inside the inverter cooling passage 51a, the communication passage 353 and the stator cooling passage 352 are able to be connected with each other, at the end on the side (−X side) opposite to the inflow port 54.

Thus, if the outflow port 355 is provided at the same position as the outflow port 55 of the first preferred embodiment shown in FIG. 4, it is possible to increase the distance over which the cooling medium M flows inside the stator cooling passage 352 and to provide the inflow port 54 and the outflow port 355 on the same side of the bracket 320 without partitioning the stator cooling passage 352.

In this preferred embodiment, the following configuration can also be adopted.

In this preferred embodiment, the connection passage 351e may be connected with the inverter cooling passage 51a, or may be connected with both of the inverter cooling passage 51a and the capacitor cooling passage 51c. That is, in this preferred embodiment, a configuration can be adopted in which the connection passage 351e is connected with at least one of the inverter cooling passage 51a and the capacitor cooling passage 51c.

In the above description, the inflow position 357a and the outflow position 357b of the stator cooling passage 352 are disposed on the opposite sides relative to the rotating shaft 31 in the vertical direction, but the present invention is not limited to this example. In this preferred embodiment, the inflow position 357a and the outflow position 357b may be disposed on the opposite sides relative to the rotating shaft 31 in a direction inclined from the vertical direction.

Figure 8A:
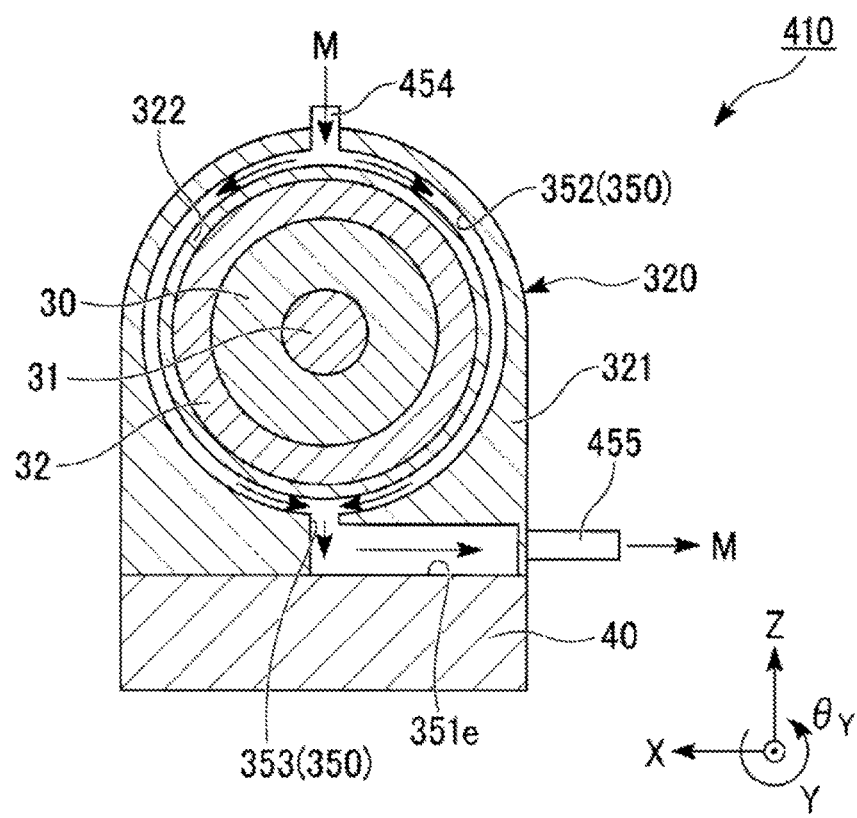
FIG. 8A is a cross-sectional view showing another example of the motor of the second preferred embodiment of the present invention.
Figure 8B:
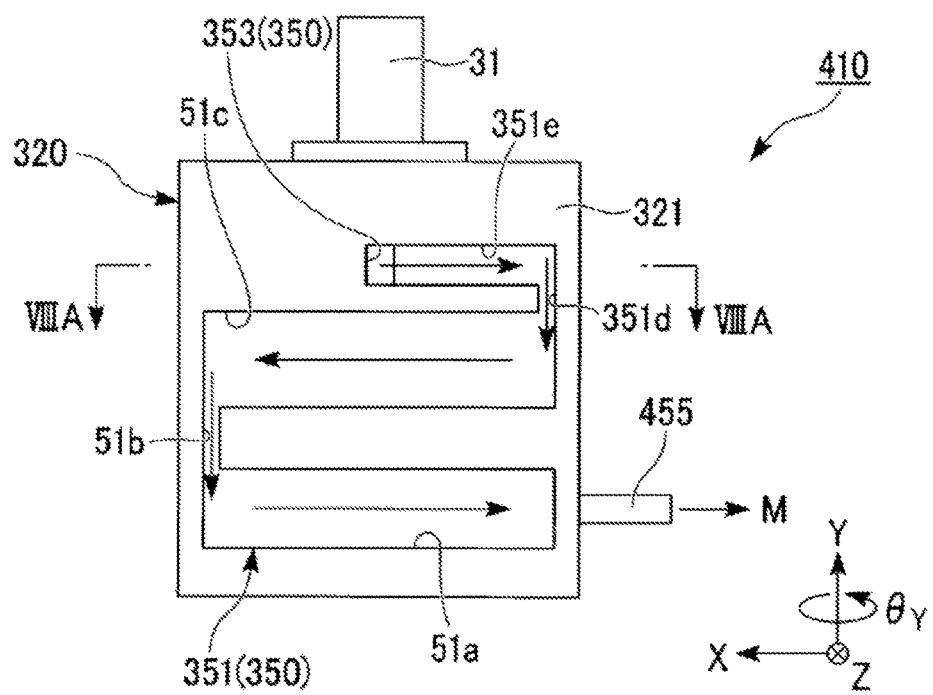
FIG. 8B is a bottom view showing another example of the motor of the second preferred embodiment of the present invention.

In this preferred embodiment, as shown in FIGS. 8A and 8B, the motor 310 may be used upside down.

FIGS. 8A and 8B are views showing a motor 410 of another example of yet another preferred embodiment. FIG.

8A is a cross-sectional view along the line VIIIA-VIIIA of FIG. 8B. FIG. 8B is a bottom view.

Configurations that are similar to those described above may be omitted from the description while being appropriately denoted by the same reference signs.

As shown in FIGS. 8A and 8B, the motor 410 is preferably different from the motor 310 shown in FIGS. 7A and 7B in that it is used upside down, and that the inflow port 54 of the motor 310 is used as an outflow port 455 while the outflow port 355 of the motor 310 is used as an inflow port 454. The other configurations of the motor 410 are the same as those of the motor 310 shown in FIGS. 7A and 7B.

In this preferred embodiment, the flow of the cooling medium M inside the cooling passage 350 is reversed from that of the motor 310.

According to this configuration, since the cooling medium M flows into the cooling passage 350 from the stator cooling passage 352 connected with the inflow port 454, the stator 32 is easily cooled.

In this configuration, the connection passage 351e may preferably be connected with the inverter cooling passage 51a. In this case, since the inverter cooling passage 51a is cooled before the capacitor cooling passage 51c, the inverter cooling passage 51a, which generates a large amount of heat, is easily cooled.

Third Preferred Embodiment

The third preferred embodiment is preferably different from the first preferred embodiment in mounting position of the control device 40.

Configurations that are similar to those of the above-described preferred embodiment may be omitted from the description while being appropriately denoted by the same reference signs discussed above.

Figure 9A:
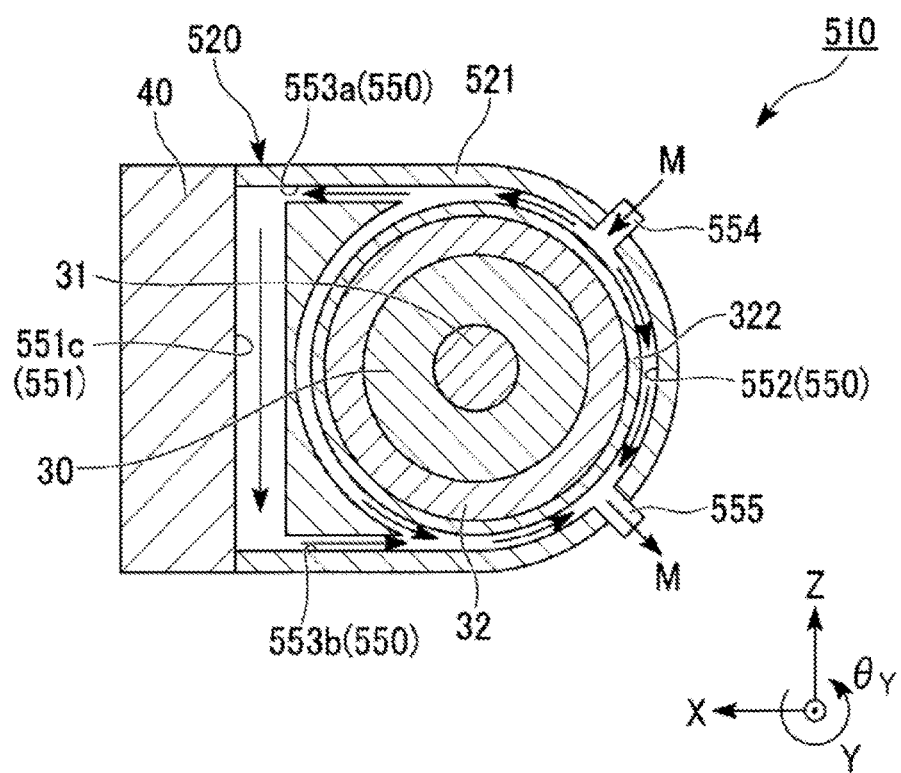
FIG. 9A is a cross-sectional view showing a motor of a third preferred embodiment of the present invention.
Figure 9B:
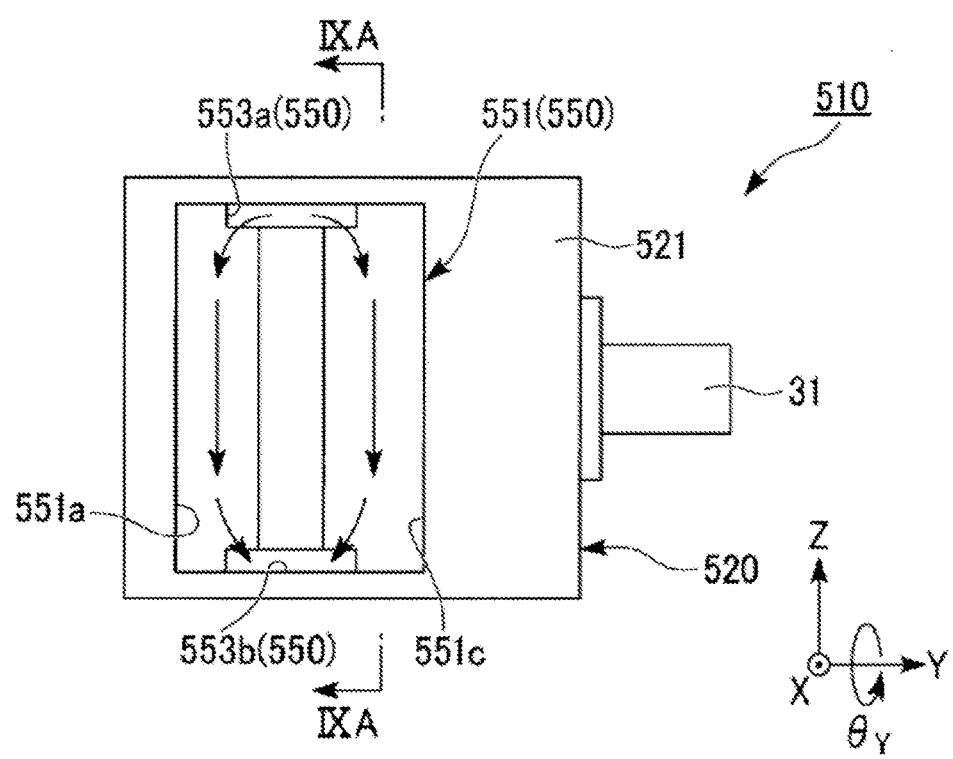
FIG. 9B is a side view showing a motor of a third preferred embodiment of the present invention.

FIGS. 9A and 9B are views showing a motor 510 of this preferred embodiment. FIG. 9A is a cross-sectional view along the line IXA-IXA of FIG. 9B. FIG. 9B is a side view (YZ-plane view). In FIG. 9B, the control device 40 is not shown.

As shown in FIGS. 9A and 9B, the motor 510 of this preferred embodiment includes a bracket 520. The bracket 520 preferably includes a bracket main body 521 and the stator frame 322. In this preferred embodiment, the control device 40 is mounted on the bracket 520. More specifically, the control device 40 is mounted on one side (+X side) in the horizontal direction of the bracket main body 521.

The bracket main body 521 is provided with a cooling passage 550, and an inflow port 544 and an outflow port 555.

The cooling passage 550 preferably includes a control device cooling passage 551, a stator cooling passage 552, and a communication passage.

In this preferred embodiment, the communication passage preferably includes an upper communication passage 553a and a lower communication passage 553b.

As shown in FIG. 9A, the inflow port 554 and the outflow port 555 are connected with the stator cooling passage 552. The position at which the inflow port 554 is connected is a position of about 45° clockwise rotation in the circumferential direction from the vertically upper-side (+Z-side) end of the stator cooling passage 552 when viewed in the −Y direction. The position at which the outflow port 555 is connected is a position of about 45° counterclockwise rotation in the circumferential direction from the vertically lower-side (−Z-side) end of the stator cooling passage 552 when viewed in the −Y direction.

The upper communication passage 553a is preferably connected at the vertically upper-side (+Z-side) end of the stator cooling passage 552. The lower communication passage 553b is connected at the vertically lower-side (−Z-side) end of the stator cooling passage 552.

The other configurations of the stator cooling passage 552 are preferably the same as those of the stator cooling passage 52 of the second preferred embodiment shown in FIG. 7A.

As shown in FIG. 9A, the upper communication passage 553a and the lower communication passage 553b extend in the horizontal direction (X-axis direction).

The +X-side end of the upper communication passage 553a is connected with the vertically upper side (+Z side) of the control device cooling passage 551. The +X-side end of the lower communication passage 553b is connected with the vertically lower side (−Z side) of the control device cooling passage 551.

As shown in FIG. 9B, the control device cooling passage 551 includes an inverter cooling passage 551a and a capacitor cooling passage 551c.

The inverter cooling passage 551a and the capacitor cooling passage 551c extend in the vertical direction (Z-axis direction) and are provided side by side. That is, the control device cooling passage 551 extends in the vertical direction.

The vertically upper-side (+Z-side) end of the inverter cooling passage 551a and the vertically upper-side end of the capacitor cooling passage 551c are both connected with the upper communication passage 553a.

The vertically lower-side (−Z-side) end of the inverter cooling passage 551a and the vertically lower-side end of the capacitor cooling passage 551c are both connected with the lower communication passage 553b.

The other configurations of the control device cooling passage 551 are preferably the same as those of the control device cooling passage 51 of the first preferred embodiment shown in FIG. 2.

In this preferred embodiment, as shown in FIG. 9A, part of the cooling medium M having flowed from the inflow port 554 into the stator cooling passage 552 flows into the control device cooling passage 551 through the upper communication passage 553a. As shown in FIG. 9B, the cooling medium M having flowed into the control device cooling passage 551 diverts to the inverter cooling passage 551a and the capacitor cooling passage 551c and flows in the vertically downward direction (−Z direction). The divided cooling medium M merges in the lower communication passage 553b and flows out of the control device cooling passage 551. Then, as shown in FIG. 9A, the cooling medium M flows again into the stator cooling passage 552 through the lower communication passage 553b and is discharged from the outflow port 555.

The remaining portion of the cooling medium M having flowed from the inflow port 554 into the stator cooling passage 552 does not flow into the control device cooling passage 551, but flows inside the stator cooling passage 552 and is discharged from the outflow port 555.

According to this preferred embodiment, the control device cooling passage 551, namely, the inverter cooling passage 551a and the capacitor cooling passage 551c, extend in the vertical direction. Therefore, because the cooling medium M flows by gravity inside the control device cooling passage 551, the load on the water pump is preferably reduced. Moreover, a decrease in flow velocity of the cooling medium M inside the control device cooling passage 551 is prevented.

In this preferred embodiment, the stator cooling passage 552 may be provided with a partition. It is possible to allow the entire cooling medium M, which flows into the stator cooling passage 552, to flow into the control device cooling passage 551 by providing the stator cooling passage 552 with the partition, for example, at a position located between the inflow port 554 and the outflow port 555 in the vertical direction and at a position located between the upper communication passage 553a and the lower communication passage 553b in the vertical direction.

Other than those configurations shown in the first preferred embodiment to the third preferred embodiment described above, a configuration in which the inflow port and the outflow port are connected with the control device cooling passage may be adopted. In this configuration, the cooling medium M, which has flowed from the water pump into the control device cooling passage, flows again into the control device cooling passage through the cooling passages, in the order of the communication passage, the stator cooling passage, and the other communication passage, and is discharged to the water pump.

The present invention is not limited to the case where the control device 40 is mounted on the vertically upper side or the vertically lower side of the bracket 20. For example, the control device 40 may alternatively be provided on the other side in the central axial direction of the bracket 520. In this case, one end of the rotating shaft in the central axial direction protrudes from the bracket.

In the above preferred embodiments of the present invention, an SR motor is taken as an example of the motor, but the present invention is not limited to this example. The present invention can also be applied to any other inner rotor motors that are publicly known. In addition, there is no particular limitation on the intended use of the motor to which the present invention is applied.

The first preferred embodiment to the third preferred embodiment described above can be appropriately combined as far as these preferred embodiments are consistent with one another.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a rotating shaft extending in a central axial direction;
a stator including a core back concentric with the rotating shaft; and
a bracket housing the stator; wherein
the bracket includes a cylindrical bracket main body, and a stator frame which faces the bracket main body and holds an outer surface of the stator on a radially inward side of the bracket main body, the bracket main body and the stator frame being defined by separate members;
the bracket is provided with a cooling passage through which a cooling medium is able to flow, and an inflow port and an outflow port connected with the cooling passage;
the cooling passage includes a first portion provided directly adjacent to a radially outermost surface of the bracket main body, a second portion provided radially between a radially innermost surface of the bracket main body and the stator frame, and a communication passage coupling an output of the first portion and an input of the second portion with each other;
a cooling medium in the first portion and a cooling medium in the second portion flow in opposite circumferential directions with respect to one another;
at least a portion of the communication passage is located at a position which is farther outward in a radial direction than any portion of the second portion such that the communication passage does not overlap a radially inner surface of the second portion when viewed in a direction extending along the communication passage; and
a portion of the communication passage and a portion of the core back overlap one another when viewed from a radial direction which is orthogonal to both the central axial direction and the direction extending along the communication passage.

2. The motor according to claim 1, further comprising
an inverter mounted on the bracket; and
a control device mounted on the bracket main body; wherein
the first portion of the cooling passage includes an inverter cooling passage provided radially between the radially outermost surface of the bracket main body and the inverter and a capacitor cooling passage provided radially between the radially outermost surface of the bracket main body and the control device;
the second portion is a stator cooling passage that cools the stator; and
the communication passage couples an output of the capacitor cooling passage and an input of the stator cooling passage with each other; and
the outflow port is provided farther on a vertically lower side than the inflow port.

3. The motor according to claim 2, wherein the inflow port is connected with the capacitor cooling passage.

4. The motor according to claim 3, wherein
the stator cooling passage is provided around the stator along an entire circumference thereof;
the bracket includes a partition which is located between the stator frame and the bracket main body and extends in the central axial direction;
in a direction in which the stator cooling passage extends, one end of the partition is provided at a same position as an end at an inflow position, at which the cooling medium flows into the stator cooling passage, on a side closer to an outflow position, at which the cooling medium flows out of the stator cooling passage; and
in the direction in which the stator cooling passage extends, another end of the partition is provided at a position closer to the outflow position than the one end.

5. The motor according to claim 3, wherein
the stator cooling passage is provided around the stator along an entire circumference thereof;
an inflow position at which the cooling medium flows into the stator cooling passage is provided, relative to the rotating shaft, on a side opposite to an outflow position at which the cooling medium flows out of the stator cooling passage; and
the outflow position is provided on a vertically lower side of the inflow position.

6. The motor according to claim 2, wherein the control device is mounted on a vertically upper side of the bracket.

7. The motor according to claim 6, wherein the communication passage extends in a vertical direction.

8. The motor according to claim 2, wherein the control device is mounted on a vertically lower side of the bracket.

9. The motor according to claim 8, wherein the communication passage extends in a vertical direction.

10. The motor according to claim 2, wherein the control device is mounted on one side in a horizontal direction of the bracket, and the capacitor cooling passage extends in a vertical direction.

11. The motor according to claim 2, wherein
one end in the central axial direction of the rotating shaft protrudes from the bracket; and
the control device is provided on another side in the central axial direction of the bracket.

12. The motor according to claim 2, further comprising:
a capacitor cooling fin which is mounted on the control device and at least a portion of which is disposed inside the capacitor cooling passage; and
an inverter cooling fin which is mounted on the inverter and at least a portion of which is disposed inside the inverter cooling passage; wherein
the control device includes a capacitor; and
the capacitor cooling fin is mounted on the capacitor.

13. The motor according to claim 12, wherein
the inverter cooling passage and the capacitor cooling passage are provided side by side and include ends on a same side connected with each other.

14. The motor according to claim 13, further comprising a connection passage which is connected with at least one of the inverter cooling passage and the capacitor cooling passage.

15. The motor according to claim 2, wherein a portion of the capacitor cooling passage and a portion of the stator cooling passage overlap one another when viewed from the radial direction.

16. The motor according to claim 2, wherein the communication passage is located within the bracket main body at a position radially inward from the capacitor cooling passage and radially outward from the stator cooling passage.

17. The motor according to claim 1, wherein
the inflow port and the outflow port are not parallel to one another; and
the outflow port is inclined with respect to the radial direction.

18. The motor according to claim 2, wherein
an output of the inverter cooling passage is directly connected to an input of the capacitor cooling passage and an output of the capacitor cooling passage is directly connected to an input of the stator cooling passage.

19. The motor according to claim 2, wherein
a portion of the bracket main body which overlaps the rotating shaft when viewed in a direction from the control device toward the bracket is located between the cooling passage and the stator; and
the inverter cooling passage includes an inverter cooling passage protrusion and the capacitor cooling passage includes a capacitor cooling passage protrusion, the inverter cooling passage protrusion and the capacitor cooling passage protrusion being provided in a bottom surface of the cooling passage at a position which overlaps the rotating shaft when viewed in the direction from the control device toward the bracket.

* * * * *